Sept. 7, 1926.

M. H. HEIGHTON

PIE CRIMPING AND TRIMMING DEVICE

Filed Dec. 10, 1925

1,599,129

Inventor
Marius H. Heighton

By Watson E. Coleman
Attorney

Patented Sept. 7, 1926.

1,599,129

UNITED STATES PATENT OFFICE.

MARIUS HERBERT HEIGHTON, OF RAVENNA, OHIO.

PIE CRIMPING AND TRIMMING DEVICE.

Application filed December 10, 1925. Serial No. 74,527.

This invention relates to pie crimping and trimming devices and has for an important object thereof the provision of a device for simultaneously crimping and ornamenting the edge of a pie crust and for trimming the excess material therefrom.

A further object of the invention is to produce a device of this character so constructed that the crimping and ornamenting element may be readily removed and replaced, thus enabling the use at all times of a seasonable ornamentation.

Other objects and advantages will appear throughout the course of the following description.

My invention is illustrated in the accompanying drawing, wherein:—

Figure 1:
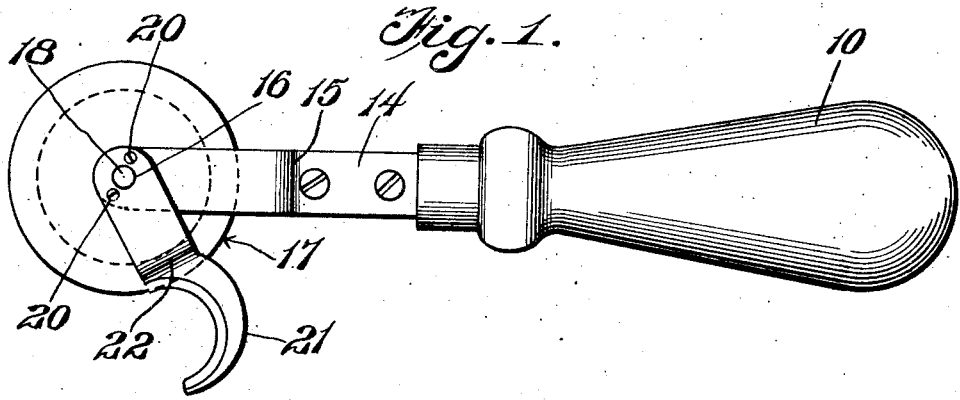
Figure 1 is a side elevation of a pie crimping and trimming device constructed in accordance with my invention.
Figure 2:
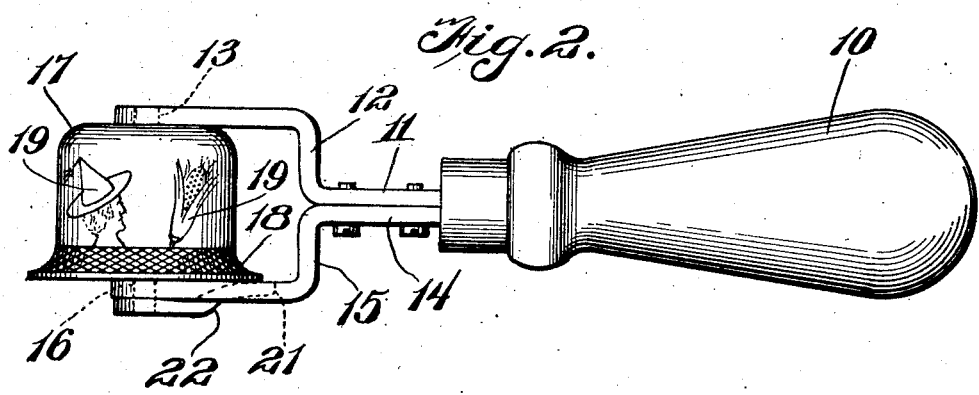
Figure 2 is a plan view thereof.
Figure 3:
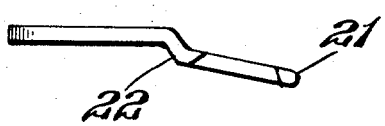
Figure 3 is a side elevation of a left hand knife removed.
Figure 4:
Figure 4 is a side elevation of a right hand knife removed.

Referring now more particularly to the drawing, the numeral 10 indicates a suitable handle having mounted therein an arm 11 offset from the axis of the handle, as at 12, and provided at its outer end with a pivot opening 13. A second and oppositely offset arm 14 is detachably connected to the handle 10, as at 15, and arm 11 adjacent the handle 10, as at 15, and has at its outer end a pivot opening 16 aligning with the pivot opening 13 of the arm 11.

The arms are adapted to interchangeably receive therebetween rollers 17 each having a pivot shaft 18 affixed thereto and the ends of which engage in the openings 13 and 16 of the arms 11 and 14 respectively. Each roller 17 has its side face of substantially ogee formation, the re-entrant curve 18ᵃ of which has its face milled or otherwise ornamented while the remaining surface is provided with occasional illustrations 19 suitable to the occasion or period in which the pie, the crust of which is being treated, will be employed. Several rollers 17 will be provided and may be readily substituted one for the other. Secured to the outer face of the outer end of the arm 14, as at 20, is a trimming knife 21, the shank of which is offset, as at 22, but the cutting edge thereof substantially coincides with the adjacent edge of the roller 17 engaging the dough of the pie crust at a point immediately to the rear of the vertical axis of the roller when in operation. This knife, in addition to trimming the excess dough from the pie crust forms a guide for the roller 17 during the use thereof.

It will be obvious that the construction hereinbefore set forth is obviously capable of a certain range of change and modification without materially departing from the spirit of the invention and I accordingly do not limit myself to such specific structure except as hereinafter claimed.

I claim:—

1. In a device for ornamenting pie crusts, a handle, a pair of arms carried by the handle and having their outer ends spaced, an ornamenting roller pivoted between the arms and a trimming knife secured to one of the arms and having its cutting edge immediately adjacent the adjacent end of the roller, one of said arms being permanently attached to said handle, the other of the arms being detachably secured to the first named arm to thereby permit ready removal and replacement of the roller.

2. In a pie crust ornamenting device, a handle and an arm affixed to the handle and offset intermediate its ends away from the axis of the handle, a second arm detachably secured to the first named arm and oppositely offset therefrom and having at its outer end a pivot receiving opening aligning with the opening of the first named arm and an ornamenting roller having a projecting pivot shaft the ends of which are adapted for engagement in said opening.

3. An ornamenting roller for ornamenting the rim portions of pie crusts having its face of substantially ogee formation.

In testimony whereof I hereunto affix my signature.

MARIUS HERBERT HEIGHTON.